US008729396B2

(12) United States Patent
Zhang et al.

(10) Patent No.: US 8,729,396 B2
(45) Date of Patent: May 20, 2014

(54) FULL COMPOSITE INSULATOR FOR ELECTRICAL CUTOUT

(75) Inventors: Chao Zhang, Franklin, WI (US); Alan P. Yerges, Muskego, WI (US); Stephen P. Hassler, Muskego, WI (US)

(73) Assignee: Cooper Technologies Company, Houston, TX (US)

( * ) Notice: Subject to any disclaimer, the term of this patent is extended or adjusted under 35 U.S.C. 154(b) by 328 days.

(21) Appl. No.: 12/874,907

(22) Filed: Sep. 2, 2010

(65) Prior Publication Data

US 2012/0055695 A1     Mar. 8, 2012

(51) Int. Cl.
*H01B 3/00* (2006.01)
*H01H 71/10* (2006.01)

(52) U.S. Cl.
USPC ........................... 174/138 C; 337/171

(58) Field of Classification Search
CPC .................................................. C23C 16/345
USPC ................. 174/138 C, 178; 337/171
See application file for complete search history.

(56) References Cited

U.S. PATENT DOCUMENTS

| | | | |
|---|---|---|---|
| 2,074,913 A * | 3/1937 | Johnson | 337/172 |
| 2,310,466 A * | 2/1943 | Schultz et al. | 337/157 |
| 2,648,737 A * | 8/1953 | Wallace et al. | 337/190 |
| 4,217,466 A | 8/1980 | Kuhl | |
| 4,243,628 A | 1/1981 | Herold | |
| 4,296,276 A | 10/1981 | Ishihara et al. | |
| 4,373,113 A | 2/1983 | Winkler et al. | |
| 4,540,968 A * | 9/1985 | Kato et al. | 337/31 |
| 4,774,488 A * | 9/1988 | Field | 337/171 |
| 4,870,387 A * | 9/1989 | Harmon | 337/168 |
| 5,220,134 A | 6/1993 | Novel et al. | |
| 5,233,132 A | 8/1993 | Soucille | |
| 5,300,912 A | 4/1994 | Tillery et al. | |
| 5,389,742 A | 2/1995 | Clabburn et al. | |
| 5,406,033 A | 4/1995 | Pazdirek | |
| 5,540,991 A | 7/1996 | Hayakawa et al. | |
| 5,563,379 A | 10/1996 | Kunieda et al. | |
| 5,633,478 A | 5/1997 | Ishino | |
| 5,869,178 A * | 2/1999 | Kusy et al. | 428/335 |
| 5,877,453 A | 3/1999 | Hill | |
| 5,925,855 A | 7/1999 | Denndörfer | |
| 5,945,636 A | 8/1999 | Sakich et al. | |
| 5,973,272 A | 10/1999 | Levillain et al. | |
| 5,986,216 A | 11/1999 | Krause | |

(Continued)

FOREIGN PATENT DOCUMENTS

| | | | |
|---|---|---|---|
| WO | PCT/JP/2007052001 | * | 6/2007 |
| WO | PCT/JP/2007071519 | * | 6/2007 |
| WO | WO 2007097184 A1 * | | 8/2007 |

OTHER PUBLICATIONS

The International Search Report and Written Opinion for corresponding PCT application serial No. PCT/US2011/047824, mailed Dec. 12, 2011 (10 pages).

*Primary Examiner* — Adrian S Wilson
*Assistant Examiner* — Abhishek Rathod
(74) *Attorney, Agent, or Firm* — King & Spalding LLP

(57) ABSTRACT

An insulator for an electrical cutout having a fuse assembly, and methods of manufacturing. The insulator includes a weathershed housing and a single-piece full composite insulator body having no metal components. The insulator body includes a nonmetal composite polymer and a plurality of fibers. The insulators have improved mechanical strength and electrical performance over conventional insulators.

21 Claims, 7 Drawing Sheets

(56) References Cited

U.S. PATENT DOCUMENTS

| | | |
|---|---|---|
| 6,031,186 A | 2/2000 | Sakich et al. |
| 6,065,207 A | 5/2000 | Fujii et al. |
| 6,392,526 B1 * | 5/2002 | Roberts et al. ............... 337/178 |
| 6,593,842 B2 * | 7/2003 | Haynam et al. ............... 337/171 |
| 6,952,154 B2 | 10/2005 | Almgren et al. |
| 7,532,103 B2 | 5/2009 | Almgren et al. |
| 2003/0144388 A1 * | 7/2003 | Swift et al. ............... 524/79 |
| 2003/0231097 A1 * | 12/2003 | Almgren et al. ............... 337/171 |
| 2006/0169479 A1 * | 8/2006 | Dillon et al. ............... 174/113 R |
| 2008/0217815 A1 * | 9/2008 | Akopyan ............... 264/314 |
| 2009/0176923 A1 * | 7/2009 | Fujii et al. ............... 524/494 |
| 2010/0080992 A1 * | 4/2010 | Shimada et al. ............... 428/395 |

* cited by examiner

FULL COMPOSITE INSULATOR FOR ELECTRICAL CUTOUT

TECHNICAL FIELD

The present invention relates generally to electrical cutouts for high voltage applications, such as electrical power distribution systems. More specifically, this invention relates to nonmetal composite insulators for fuse cutouts.

BACKGROUND OF THE INVENTION

An electrical cutout is a protective device that is used to protect a power distribution grid. The cutout generally includes a fuse assembly and an insulator. The fuse assembly includes a fuse element, and contacts of the fuse assembly, that is located between a high voltage power distribution line and a section of the power distribution grid. The fuse element in the cutout is designed to blow if there is a surge in the electrical power current due to a fault or overload current in the protected section of the system, and thereby power is removed from the faulted section of the distribution grid. As a result, only the faulted section of the grid loses power, and the remaining grid is protected from the current surge and is still operational.

Conventional insulators for cutouts generally include a housing containing an insulator body. The insulator body typically includes three metal connectors, or inserts, for coupling a frame of the insulator body to upper and lower contact assemblies and to a utility structure. The metal connectors are separate components that are attached to the frame of the insulator body. The insulator generally is exposed to the challenges of mechanical stress and electrical stress while in operation. When the fuse element in the fuse assembly of the cutout is blown, physical force is exerted on the insulator and the metal connectors. Consequently, the insulator must be manufactured with sufficient strength to withstand damage from the fuse element when it is blown. As a result, conventional insulator bodies for fuse cutouts have typically used metal inserts, since metal can provide the desired mechanical strength for the application. Some insulators have been made with porcelain or some other ceramic material for strength to prevent damage when the fuse element activates. The ceramic insulators, however, are heavy and bulky; they require specialized assembly fixtures or processes and are awkward and difficult to handle and ship. The ceramic insulators are also brittle and easily chipped or broken. Other insulators have been made with plastics or polymers in an attempt to overcome some of the failure problems associated with ceramic insulators. However, these insulators typically include an insulator body having multiple metal components, and the electric field is concentrated in the vicinities of the metal components in these insulators. As a result, the connection areas between each of the components are electrically weak. In addition, conventional insulator bodies having multiple components require long manufacturing times and higher costs associated with manufacturing the insulators.

SUMMARY OF THE INVENTION

The insulators for an electrical cutout described herein have improved mechanical strength and electrical performance over conventional insulators. In one aspect, insulators for an electrical cutout include an insulative housing surrounding at least a portion of an insulator body. The insulator body has a frame having a first end and a second end, a first extension extending from the first end, and a second extension extending from the second end. The first and second extensions are integral to the frame. A third extension can be coupled to or integrally molded to a center of the frame as well. The insulator body is manufactured from a nonmetal composite polymer and a plurality of fibers, where the fibers have a length greater than about 12 millimeters. The fiber content in the polymer is at least 45 percent. The nonmetal composite polymer is a thermoset or thermoplastic material, such as an epoxy, polyester, vinyl ester, polyimide, and polycarbonate. The fibers are glass fibers, or polymer fibers, such as polyester or polypropylene.

In another aspect, insulators for an electrical cutout include an insulative weathershed housing surrounding at least a portion of an insulator body. The insulator body is constructed from a nonmetal composite material having volume resistivity of greater than about $10^{14}$ ohm-centimeter and a tensile strength of at least 30000 pounds per square inch.

In yet another aspect, methods of manufacturing an insulator body of the insulator include the steps of placing a preheated nonmetal composite material into a heated mold for the insulator body, closing the mold with a top force or a plug member, applying pressure and heat until the nonmetal composite material hardens to thereby form the insulator body, and removing the insulator body from the mold. The insulator body is a single component that includes a frame, and a first end extension and a second end extension integrally molded as part of the frame. A center extension can be integrally molded as part of the frame as well. The nonmetal composite material can include long fibers, such as fibers having a length greater than 12 millimeters. The presence of the long fibers in the areas between the frame and the extensions increases the mechanical strength of the insulator body over conventional insulators.

In yet another aspect, methods of manufacturing an insulator body of the insulator include the steps of heating a nonmetal composite polymer in a chamber, placing a material comprising a plurality of fibers into a heated mold to form the insulator body, forcing the heated nonmetal composite polymer into the mold using a plunger, applying pressure and heat until the material within the mold has hardened, and removing the insulator body from the mold. The insulator body is a single component that includes a frame, and a first end extension and a second end extension integrally molded as part of the frame. A center extension can be integrally molded as part of the frame as well. The nonmetal composite material can include long fibers, such as fibers having a length greater than 12 millimeters. The presence of the long fibers in the areas between the frame and the extensions increases the mechanical strength of the insulator body over conventional insulators.

DETAILED DESCRIPTION OF THE INVENTION

Figure 1:
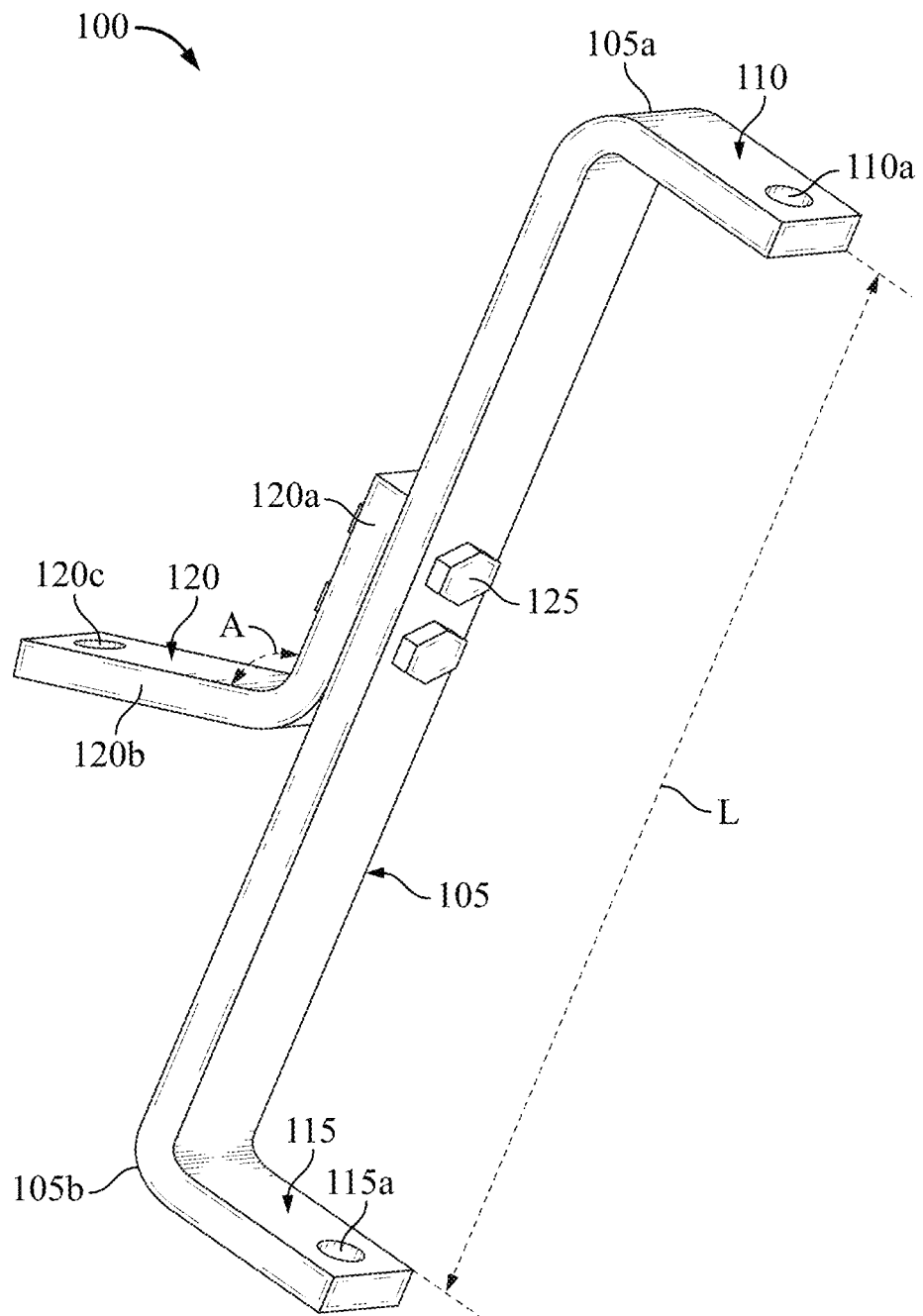
FIG. 1 is a perspective view of an insulator body of an insulator for an electrical cutout, according to an exemplary embodiment.

The invention may be better understood by reading the following description of non-limiting, exemplary embodiments with reference to the attached drawings wherein like parts of each of the figures are identified by the same reference characters.

An electrical cutout described herein generally includes an insulator and a fuse assembly. The insulator includes a housing containing a full composite insulator body having no metal components. The insulator body typically includes three extensions for coupling the insulator body to upper and lower contacts of the fuse assembly, and to a utility structure, whereby at least the extensions at the ends of the insulator body are integrally molded to the insulator body. Generally, the cutouts described herein include insulators having improved mechanical strength and electrical performance over conventional insulators. The insulators are also able to withstand a normal expected lifetime of outdoor exposure under normal operating conditions, and resist deterioration that can be caused by electrical, thermal, mechanical, and environmental stresses. Additionally, manufacturing the insulators requires less time, and therefore reduces costs, when compared to conventional insulators.

FIG. 1 is a perspective view of a full composite insulator body 100 for an insulator of an electrical cutout, according to an exemplary embodiment. The insulator body 100 includes a frame 105, a first end extension 110, a second end extension 115, and a center extension 120. The frame 105 is generally rectangular-shaped with a first end 105a and a second end 105b, and has a length L to accommodate a length of a fuse assembly (not shown) to be coupled to the insulator body 100. The first end extension 110 is integral to and extends from the first end 105a of the frame 105 in a direction that is generally orthogonal to the frame 105. In certain exemplary embodiments, the first end extension 110 includes an opening 110a therein for receiving a fastening means (not shown) to couple the first end extension 110 to a first end of a fuse assembly. In certain alternative embodiments, the first end extension 110 includes two or more openings 110a therein for receiving fastening means. The second end extension 115 is integral to and extends from the second end 105b of the frame 105 in a direction that is generally orthogonal to the frame 105. In certain exemplary embodiments, the second end extension 115 includes an opening 115a therein for receiving a fastening means (not shown) to couple the second end extension 115 to a second end of a fuse assembly. In certain alternative embodiments, the second end extension 115 includes two or more openings 115a therein for receiving fastening means. In certain exemplary embodiments, the openings 110a, 115a have a diameter of about 0.37 inch. In certain alternative embodiments, the openings 110a, 115a have a diameter of less than about 0.37 inch. In other alternative embodiments, the openings 110a, 115a have a diameter of greater than about 0.37 inch. The size and shape of the openings 110a, 115a can vary based on the size and shape of fastening means used to secure the fuse assembly to the insulator body 100. The frame 105, the first end extension 110, and the second end extension 115 form a single-piece structure, and can be manufactured as described with respect to the process shown in FIGS. 3 and 4.

The center extension 120 of the insulator body 100 includes a rectangular-shaped attachment portion 120a and a rectangular-shaped connection portion 120b. In certain exemplary embodiments, the connection portion 120b extends at an angle A greater than 90 degrees from the attachment portion 120a. In certain alternative embodiments, the connection portion 120b extends orthogonally from the attachment portion 120a. In certain other embodiments, the connection portion 120b extends at an angle A less than 90 degrees from the attachment portion 120a. The attachment portion 120a is secured to, and is flush with, the frame 105 at a position along the length L, such that the connection portion 120b extends in a direction opposite from the first end extension 110 and the second end extension 115. In certain exemplary embodiments, the attachment portion 120a is secured to a center of the frame 105. In certain other embodiments, the attachment portion 120a is secured at a position that is offset from the center of the frame 105. In certain embodiments, the attachment portion 120a is secured to the frame 105 using two bolts 125 extending through two openings (not shown) in the attachment portion 120a and two corresponding openings (not shown) in the frame 105. In certain alternative embodiments, the center extension 120 is integral to the frame 105. The connection portion 120b of the center extension 120 also includes an opening 120c sized to receive a fastening means for securing the center extension 120 to a utility structure (not shown).

The insulator body 100 is constructed entirely of nonmetal composite materials, and includes a polymer matrix having a fiber reinforcement. In certain exemplary embodiments, the nonmetal composite materials have a volume resistivity of greater than about $10^{14}$ ohm-centimeter (ohm-cm), and a tensile strength of at least 30000 pounds per square inch (psi). In certain exemplary embodiments, the nonmetal composite materials have a volume resistivity of greater than about $10^{15}$ ohm-cm, and a tensile strength of at least 40000 psi. Suitable examples of materials for the polymer matrix include, but are not limited to, thermoset or thermoplastic materials, such as epoxy, polyester, vinyl ester, polyimide, polycarbonate, and the like. Suitable examples for materials for fiber reinforcement include, but are not limited to, glass fibers, and polymer fibers, such as polyester, polypropylene, and the like. Generally, the fibers can be chopped or continuous fibers. In certain embodiments, the length of the fibers is about 12 millimeters (mm) or greater. In certain exemplary embodiments, the length of the fibers about 20 mm or greater.

In certain embodiments, the content of the fibers in the polymer matrix is at least 45 percent. In certain exemplary embodiments, the content of the fibers in the polymer matrix is in the range of about 50 percent to about 90 percent. In certain preferred embodiments, the content of the fibers in the polymer matrix is in the range of about 60 percent to about 70 percent. The length and content of the fibers result in the insulator body 100 having a higher mechanical strength than conventional insulator bodies, particularly in the regions where the first end extension 110 and the second end extension 115 are located due to the fibers being linked between each of the first and second end extensions 110, 115, and the frame 105. Additionally, the nonmetal composite materials are capable of withstanding a normal expected lifetime of outdoor exposure under normal operating conditions, and resist deterioration that can be caused by electrical, thermal, mechanical, and optical stresses.

Figure 2:
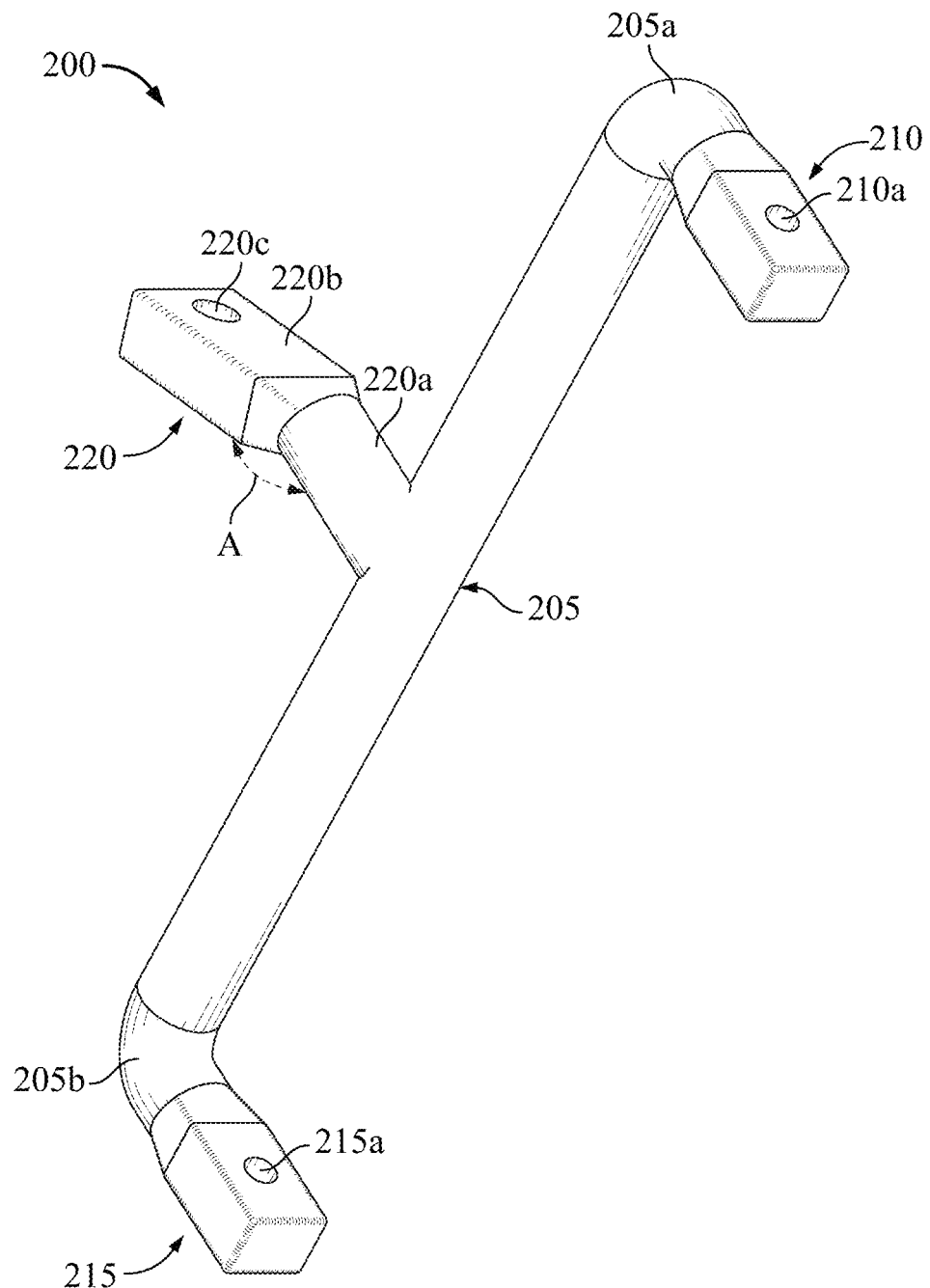
FIG. 2 is a perspective view of an insulator body of an insulator for an electrical cutout, according to another exemplary embodiment.

FIG. 2 is a perspective view of a full composite insulator body 200 for an insulator 505 of an electrical cutout 500 (FIG. 5), according to an exemplary embodiment. Similar to the insulator body 100, the insulator body 200 is constructed entirely of nonmetal composite materials, and includes a polymer matrix having a fiber reinforcement. Referring to FIG. 2, the insulator body 200 includes a frame 205, a first end extension 210, a second end extension 215, and a center extension 220. The frame 205 is generally cylindrical-shaped with a first end 205a and a second end 205b, and has a length sufficient as to accommodate a length of a fuse assembly (not shown) to be coupled to the insulator body 200. The first end extension 210 is integral to and extends from the first end 205a of the frame 205 in a direction that is generally orthogonal to the frame 205. In certain embodiments, the first end extension 210 is rectangular-shaped. In certain exemplary embodiments, the first end extension 210 includes an opening 210a therein for receiving a fastening means (not shown) to couple the first end extension 210 to a first end of a fuse assembly. In certain alternative embodiments, the first end extension 210 includes two or more openings 210a therein for receiving fastening means. The second end extension 215 is integral to and extends from the second end 205b of the frame 205 in a direction that is generally orthogonal to the frame 205. In certain embodiments, the second end extension 215 is rectangular-shaped. In certain exemplary embodiments, the second end extension 215 includes an opening 215a therein for receiving a fastening means (not shown) to couple the second end extension 215 to a second end of a fuse assembly. In certain alternative embodiments, the second end extension 215 includes two or more openings 215a therein for receiving fastening means. In certain exemplary embodiments, the openings 210a, 215a have a diameter of about 0.5 inch (in). The size and shape of the openings 210a, 215a can vary based on the size and shape of fastening means used to secure the fuse assembly to the insulator body 200. The frame 205, the first end extension 210, and the second end extension 215 form a single-piece structure, and can be manufactured as described with respect to the process shown in FIGS. 3 and 4.

The center extension 220 of the insulator body 200 includes a cylindrical-shaped portion 220a and a rectangular-shaped connection means 220b. In certain embodiments, the connection means 220b extends at an angle A greater than 90 degrees from the cylindrical-shaped portion 220a. In certain exemplary embodiments, the connection means 220b extends at an angle 160 degrees from the cylindrical-shaped portion 220a. The cylindrical-shaped portion 220a is integral to and extends orthogonally from the frame 205 at a position along the length of the frame 205, such that the connection means 220b extends in a direction opposite from the first end extension 210 and the second end extension 215. In certain exemplary embodiments, the cylindrical-shaped portion 220a extends from a center of the frame 205. In certain other embodiments, the cylindrical-shaped portion 220a extends from a position that is offset from the center of the frame 205. The connection means 220b of the center extension 220 also includes an opening 220c sized to receive a fastening means for securing the center extension 220 to a utility structure (not shown). The insulator body 200 has a higher mechanical strength than conventional insulator bodies having multiple components, particularly in the regions where the first end extension 210, the second end extension 215, and center extension 220 are located due to the fibers being linked between each of these portions and the frame 205.

Figure 3:
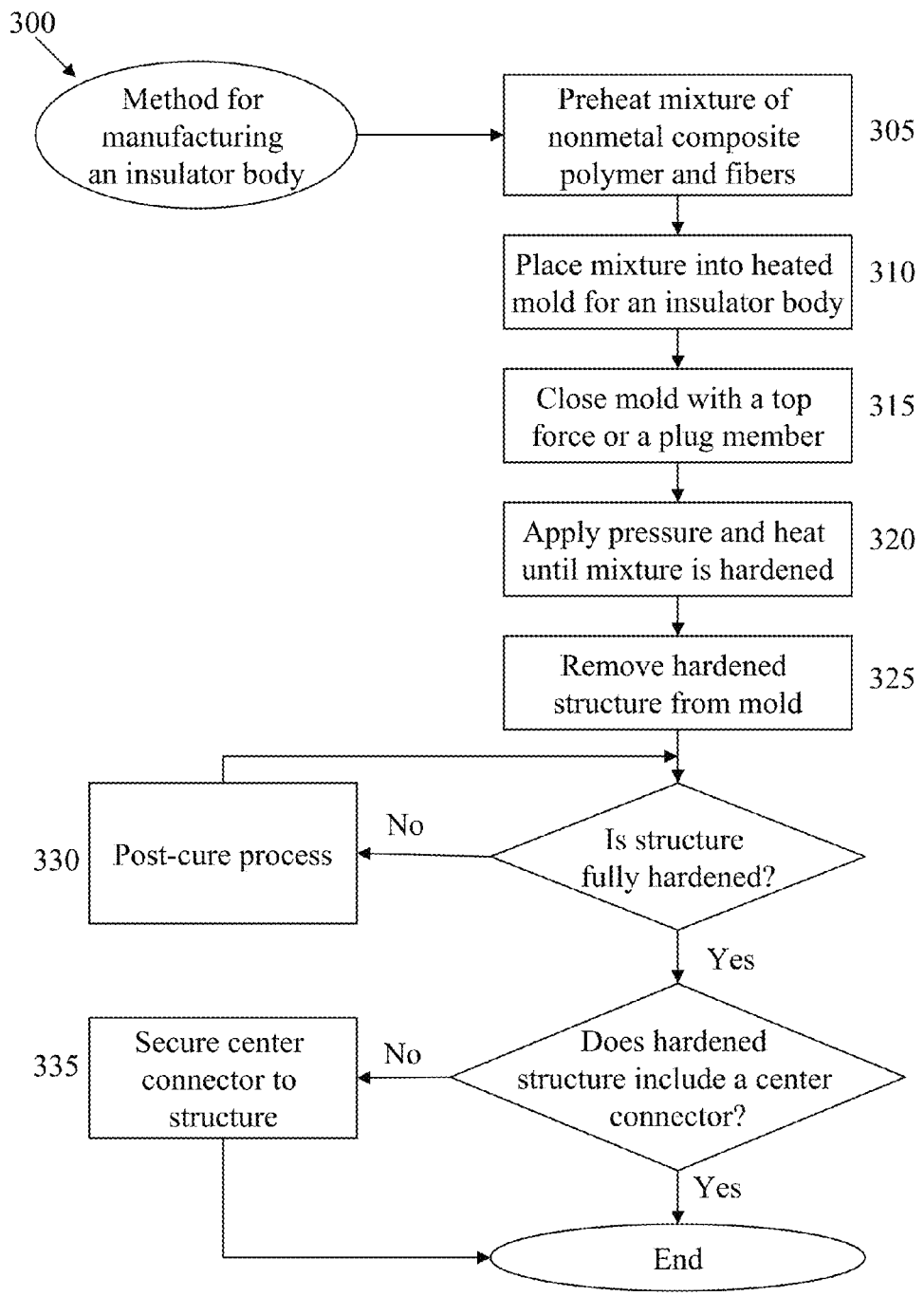
FIG. 3 is a flow diagram illustrating an exemplary method for manufacturing an insulator body, according to an exemplary embodiment.

The insulator bodies 100, 200 can be manufactured using compression molding. FIG. 3 is a flow diagram illustrating a method 300 for manufacturing a full composite insulator body using compression molding, according to an exemplary embodiment. In step 305, a mixture of nonmetal composite polymers and fibers is heated to form a preheated nonmetal composite material. Any of the various exemplary nonmetal composite materials described previously can be used. In step 310, the preheated nonmetal composite material is placed into a heated mold for an insulator body. In an exemplary embodiment, the size, shape, dimension, and configuration of the molds can be selected based upon the desired size, shape, dimension, and configuration of the insulator body. In another exemplary embodiment, a separate heated mold can be used for the center extension. In step 315, the mold is closed with a top force or a plug member. In step 320, pressure and heat are applied until the nonmetal composite material has cured or solidified. In step 325, the insulator body is removed from the mold. In step 330, if the insulator body is not fully hardened, the insulator body is further heated via a post-cure process until fully cured. In certain exemplary embodiments, the insulator body is heated in an oven or a heated conveyer. In step 335, if the center extension is a separate component, the center extension is secured to the frame of the insulator body using bolts.

Figure 4:
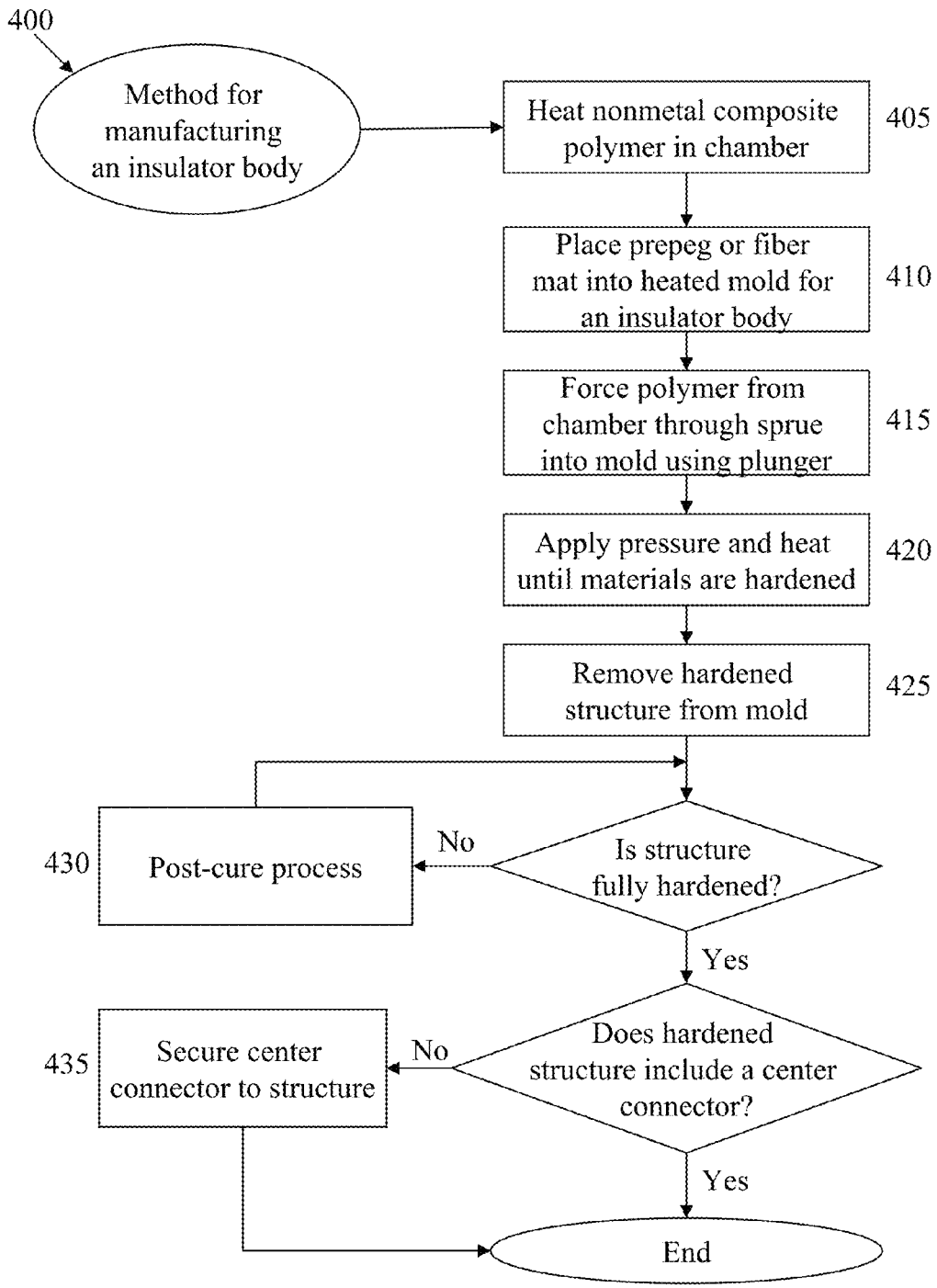
FIG. 4 is a flow diagram illustrating an exemplary method for manufacturing an insulator body, according to another exemplary embodiment.

Referring now to FIG. 4, the insulator bodies 100, 200 can be manufactured using transfer molding. FIG. 4 is a flow diagram illustrating a method 400 for manufacturing a full composite insulator body, according to another exemplary embodiment. In step 405, nonmetal composite polymers are heated in a chamber, or transfer pot. In step 410, pre-impregnated composite fibers ("prepeg") or a continuous glass fiber mat is placed in a heated mold for the insulator body. In another exemplary embodiment, the mold for the insulator body includes a mold for the frame of the insulator body and a separate mold for the center extension. In step 415, a plunger is used to force the preheated nonmetal composite polymers from the pot through channels known as a sprue into the heated mold(s). In step 420, pressure and heat are applied until the materials in the mold(s) cure or solidify. In step 425, the insulator body is removed from the mold(s). In step 430, if the insulator body is not fully hardened, the components are further heated via a post-cure process until fully cured. In certain exemplary embodiments, the components are heated in an oven or a heated conveyer. In step 435, if the frame and the center extension are two separate components, the center extension is secured to the frame using bolts.

Figure 5:
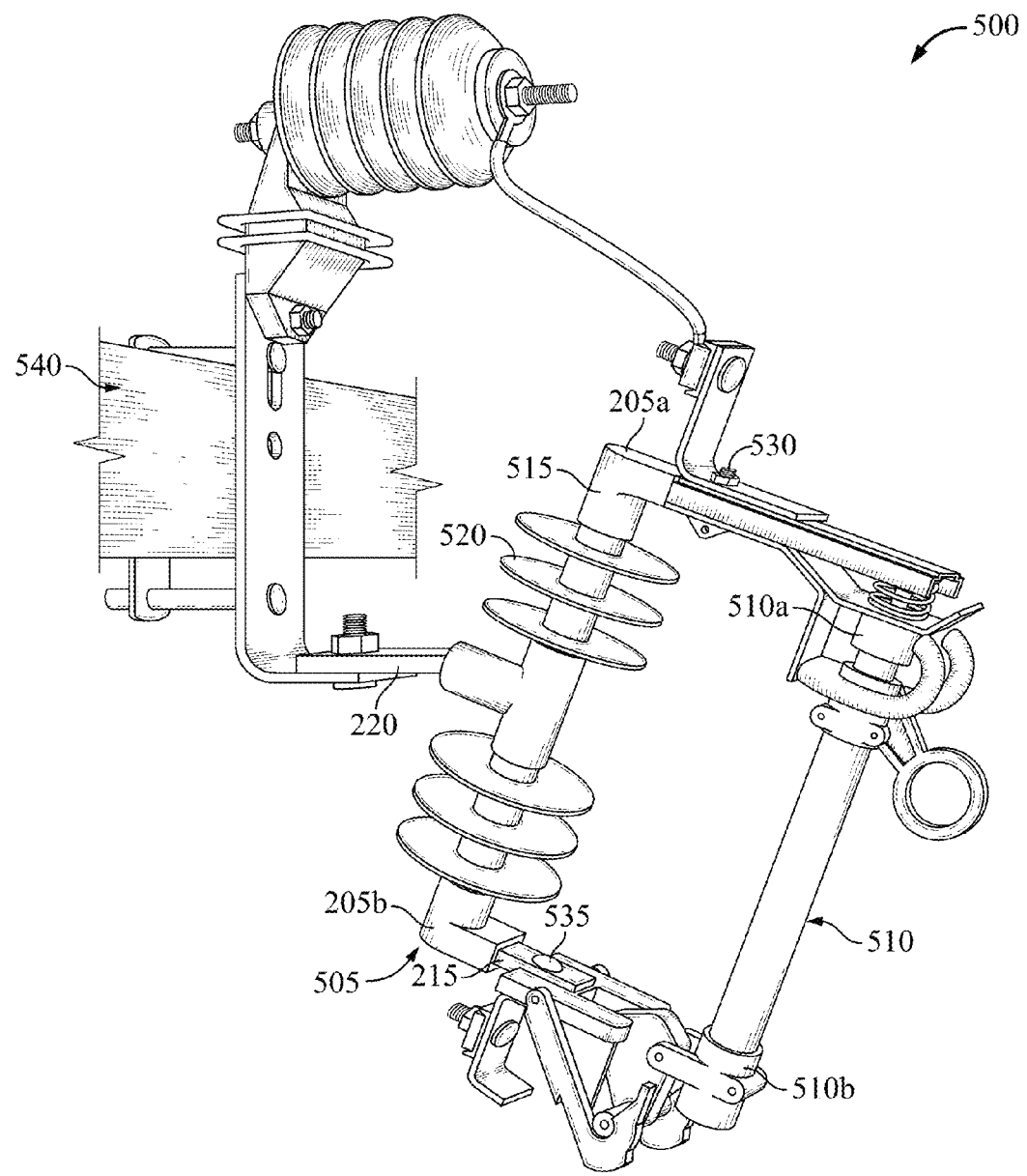
FIG. 5 is a perspective view of an electrical cutout having a fuse assembly and an insulator having the insulator body of FIG. 2, according to an exemplary embodiment.

FIG. 5 is a perspective view of an electrical cutout 500, according to an exemplary embodiment. The electrical cutout 500 includes an insulator 505 coupled to a fuse assembly 510. The insulator 505 includes the insulator body 200 (FIG. 2) and a housing 515. In certain embodiments, the housing 515 is molded over and bonded to the frame 205 (FIG. 2) of the insulator body 200. The housing 515 can include a plurality of weathersheds 520. In certain embodiments, each weathershed 520 is the same size. In certain other embodiments, each weathershed 520 is one of two sizes. In certain exemplary embodiments, the housing 515 is constructed from an insulative material, such as epoxy, silicone rubber, and ethylene-propylene-diene monomer (EPDM) rubber.

A first end 510a of the fuse assembly 510 is coupled to the first end extension 210 (FIG. 2) of the insulator body 200 using a securing means, such as a bolt 530. A second end 510b of the fuse assembly 510 is coupled to the second end extension 215 of the insulator body 200 using a securing means, such as a bolt 535. Accordingly, the fuse assembly 510 is positioned parallel to the frame 205. When a fuse element (not shown) within the fuse assembly 510 is blown, physical force is exerted on the insulator 505. Specifically, the greatest forces are exerted on the first end 205a and a second end 205b of the frame 205 of the insulator body 200, and on the center extension 220 that is coupled to a utility structure 540. The materials of construction of the insulator body 200 of the present invention are such that the insulator body 200 has sufficient strength to withstand damage from the fuse element when it is blown. Specifically, the presence of long fibers at the connection joints, for example between the frame 205 and the first end extension 210, increase the mechanical strength of the full composite insulator body 200 over conventional insulator bodies having multiple components.

To facilitate a better understanding of the present invention, the following examples of preferred embodiments are given. In no way should the following examples be read to limit or define the scope of the invention.

EXAMPLES

Example 1

Mechanical testing of a nonmetal composite material was conducted to determine if the material has a mechanical strength to withstand the flexural stress in a cutout application. The nonmetal composite material tested included polyester resin and glass fibers, with the fiber content being in the range of between 60 percent and 70 percent and the fiber length being greater than 20 millimeters. Two samples were tested for the nonmetal composite material slabs having dimensions of 4.75 in×1.25 in×0.375 in. A bolt hole having a diameter of 0.5 in was included in each sample with a mounting bolt extending therethrough.

An Instron universal testing machine, model 4400R, was used to evaluate the mechanical properties of each sample. The testing was conducted at a temperature of 20 degrees Celsius and a humidity of 50 percent. A test force was applied perpendicular to the longitudinal direction of each slab sample, at a distance of 3.37 in from the centerline of the mounting bolt. The speed of the Instron universal testing machine was set at 0.25 inch/minute (in/min). A load-extension (stress-strain) curve was obtained for the two samples. During the testing, the two composite samples showed the first yield at about 6041b and 6551b, respectively. The first yield was determined to be the point at which sample failure occurred. Results from the mechanical testing are shown in Table 1 below, which indicates the force at the failure of the samples, as well as the maximum stress at the sample when it failed. The results of conventional insulator are also included in Table 1.

TABLE 1

Mechanical Strength of Nonmetal Composite Material Samples and Conventional Insulator

| Samples | Force at the failure (lb) | Maximum Strength (psi) |
|---|---|---|
| Sample 1 | 604 | 69478 |
| Sample 2 | 655 | 75344 |
| Conventional insulator | 665 | 63140 |

The results suggest that the composite material has a sufficient mechanical strength to be used in an electrical cutout.

Example 2

The electrical field distribution in an insulator with metal connectors and a full composite insulator was investigated using the simulation software ElecNet (version 6.18) commercially available from Infolytica. The insulator with metal connectors included an insulator body having a composite frame and three metal inserts coupled thereto, while the full composite insulator included the single-piece insulator body 200 (FIG. 2). For an insulator with metal inserts, 150 kilovolts (kV) was applied to the two ends of the insulator while the center extension was connected to a grounded bracket. For a full composite insulator, two metal contacts of the fuse assembly were connected to the two ends of the insulator, the center extension was connected to a grounded metal bracket, and 150 kV was applied to the two metal contacts of the fuse assembly.

Figure 6A:
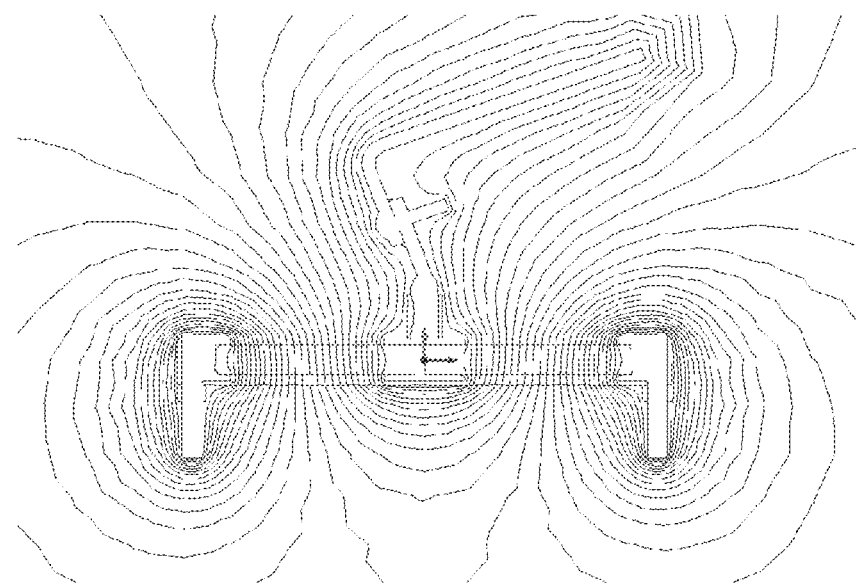
FIG. 6A illustrates an electric field distribution in a conventional metal insulator for an electrical cutout, according to an exemplary embodiment.
Figure 6B:
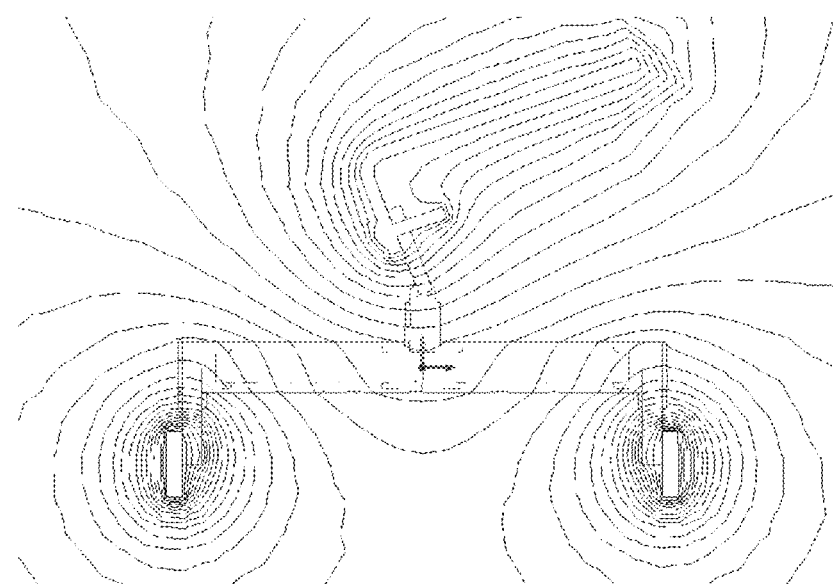
FIG. 6B illustrates an electric field distribution in a full composite insulator for an electrical cutout, according to an exemplary embodiment.
Figure 7:
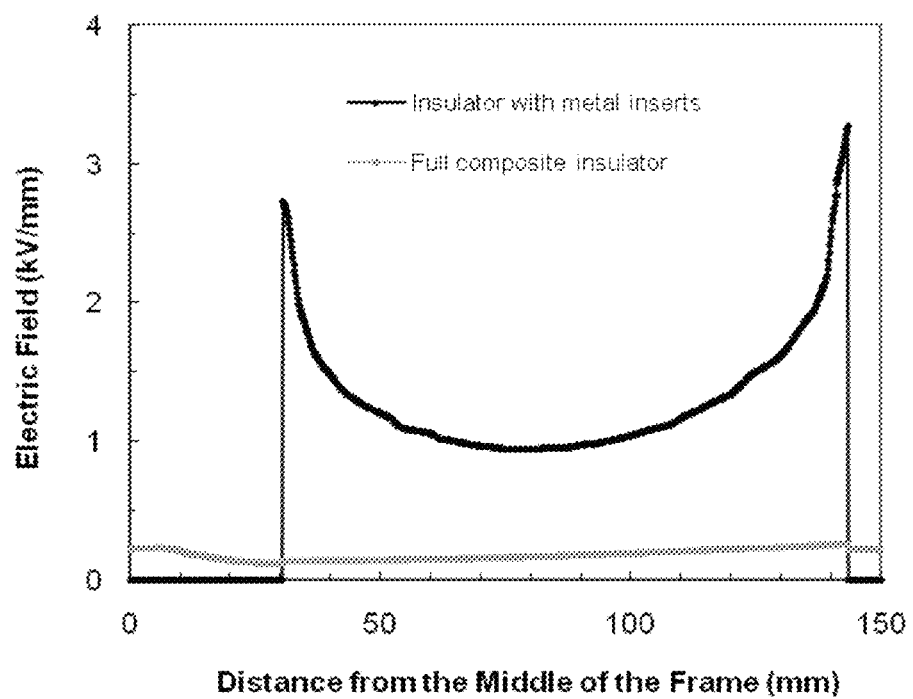
FIG. 7 is a graph illustrating the electric field along (i) a metal insulator, and (ii) a nonmetal composite insulator, according to an exemplary embodiment.

The results of the simulation are shown in FIGS. 6A, 6B, and 7. FIG. 6A illustrates an electric field distribution in the insulator with metal inserts, FIG. 6B illustrates an electric field distribution in the full composite insulator, and FIG. 7 is a graph illustrating the electric field along the frame of the insulator in both of cases: (i) the insulator with metal inserts, and (ii) the nonmetal composite insulator, according to an exemplary embodiment. As shown in FIG. 6A, the electric field is concentrated in the vicinities of the metal inserts. As shown in FIG. 6B, the electric field is concentrated only in the areas proximate the edges of the contacts of the fuse assembly and the bracket. In other words, the electric field is dependent on the metal components outside of the full composite insulator, thus suggesting that the electric field in the full composite insulator is considerably less than in the insulator with metal inserts. FIG. 7 indicates that the maximum electric field of the full composite insulator is only about one-tenth of that of the metal insulator. Therefore, based on the results of the simulation, it was determined that cutouts having a full composite insulator have significant advantages in electrical performance over cutouts having a conventional insulator with metal inserts.

Therefore, the devices described herein are adapted to attain the ends and advantages mentioned as well as those that are inherent therein. The particular embodiments disclosed above are illustrative only, as the present invention may be modified and practiced in different but equivalent manners apparent to those having ordinary skill in the art having the benefit of the teachings herein. Having described some exemplary embodiments of the present invention, it is believed that the use of alternate insulator configurations is within the purview of those having ordinary skill in the art. In addition, the frame of the insulator body is not limited to being rectangular-shaped or cylindrical-shaped. Also, nonmetal composite materials may be used in other insulators, such as standoff insulators and pin insulators. These insulators can be manufactured similarly to the insulators of the present invention, but have different structural configurations to accommodate the needs of the device in which the insulator is utilized. While numerous changes may be made by those having ordinary skill in the art, such changes are encompassed within the spirit of this invention as defined by the appended claims. It is therefore evident that the particular illustrative embodiments disclosed above may be altered or modified and all such variations are considered within the scope and spirit of the present invention.

What is claimed is:

1. An insulator for an electrical cutout, the insulator comprising:
    an insulative housing; and
    an insulator body comprising a frame having a first end and a second end, a first extension extending from the first end and integral to the frame, and a second extension extending from the second end and integral to the frame, wherein the first extension, the frame, and the second extension are molded from one continuous piece of material, wherein each of the first extension, the frame, and the second extension comprise a portion of the one continuous piece of material;

wherein the insulator body comprises a nonmetal composite polymer and a plurality of fibers, wherein the fibers have a length greater than about 12 millimeters, and wherein the insulator body has a tensile strength of at least 30000 pounds per square inch;

wherein at least one of the fibers extends from within the frame to within the first o;r Second extension; and wherein the insulative housing surrounds a portion of the frame.

2. The insulator of claim 1, wherein the insulator body includes a third extension extending from a center portion of the frame.

3. The insulator of claim 2, wherein the third extension is integrally molded to the frame and fabricated with the frame from the continuous piece of material.

4. The insulator of claim 1, wherein the fiber content in the polymer is greater than about 45 percent.

5. The insulator of claim 1, wherein the nonmetal composite polymer is a thermoset or thermoplastic material.

6. The insulator of claim 5, wherein the nonmetal composite polymer is selected from the group consisting of epoxies, polyesters, vinyl esters, polyimides, and polycarbonates.

7. The insulator of claim 1, wherein the fibers are glass fibers or polymer fibers.

8. The insulator of claim 7, wherein the polymer fibers are polyester fibers or polypropylene fibers.

9. The insulator of claim 1, wherein the insulator body has a volume resistivity of greater than about $10^{14}$ ohm-centimeter.

10. An insulator for an electrical cutout, the insulator comprising:
an insulative housing; and insulator body comprising a nonmetal composite material having volume resistivity of greater than about 1014 ohm-centimeter and a tensile strength of at least 30000 pounds per square inch,
wherein the insulator body comprising a frame having a first end and a second end, the frame comprising a first extention extending from the first end and a second extension extending from the second end, wherein the first extension and second extension are formed integrally with the frame from one continous material, wherein each of the first extension, the frame and the second extension comprise a portion of the one continous piece of material, wherein the one continous material comprises a polymer matrix comprising a plurality of fibers, wherein at least one fiber of the plurality of fibers is partially disposed in the frame and partially disposed in the first or second extension; and
wherein the insulalive housing surrounds a portion of the insulator body.

11. The insulator of claim 10, wherein the nonmetal composite material comprises a thermoset or thermoplastic material.

12. The insulator of claim 11, wherein the nonmetal composite material is selected from the group consisting of epoxies, polyesters, vinyl esters, polyimides, and polycarbonates.

13. The insulator of claim 10, wherein the nonmetal composite material includes a polymer matrix having fiber reinforcement.

14. The insulator of claim 13, wherein the fibers are glass fibers or polymer fibers.

15. The insulator of claim 14, wherein the polymer fibers are selected from the group consisting of polyester fibers, nylon fibers, polypropylene fibers, and combinations thereof.

16. A method for manufacturing an insulator body of an insulator for an electrical cutout, the method comprising:
placing a continuous nonmetal composite material into a mold to form said insulator body, wherein the one continuous nonmetal composite material forms a frame, a first integral extension, and a second integral extension wherein the frame, the first integral extension, and the second integral extension are all fabricated from the one continuous nonmetal composite material, and wherein the one continuous nonmetal composite material comprises a plurality of fibers;
orienting a first subset of the plurality of fibers to extend from within the frame to the first integral extension and a second subset of the plurality of fibers to extend from within the frame to the second integral extension;
closing the mold;
applying pressure and heat until the nonmetal composite material has hardened to thereby form said insulator body, wherein the insulator body comprises the frame, the first integral extension, and the second integral extension, wherein at least one of the plurality of fibers comprises a first end and a second end opposite and connected to the first end, wherein the first end is disposed within the frame and the second end is disposed within the first integral extension; and
removing the insulator body from the mold.

17. The method of claim 16, wherein the nonmetal composite material comprises a polymer.

18. The method of claim 16, wherein the nonmetal composite material is preheated prior to being placed in the mold.

19. The method of claim 16, wherein the mold is with a top force or a plug member.

20. The method of claim 16, further comprising securing an extension to about a center of the frame.

21. A method for manufacturing and insulator body of an insulator for an electrical cutout, the method comprising:
heating a nonmetal composite polymer in a chamber;
placing a material comprising a plurality of fibers into a heated mold;
forcing the heated nonmetal composite polymer into the mold using a plunger;
applying pressure and heat until the nonmetal composite polymer within the mold has hardened with the plurality of fibers to thereby form said insulator body, wherein said insulator body is a single component that includes a frame and at least two integral extensions extending therefrom, the at least two integral extensions comprising a first integral extension and a second integral extension, wherein the nonmetal composite polymer and the plurality of fibers form the frame and the at least two integral extensions at substantially the same time, and wherein at least one of the plurality of fibers comprises a first end and a second end opposite and connected to the first end, wherein the first end is disposed within the frame and the second end is disposed within the first integral extension;
orienting a first subset of the plurality of fibers to extend from within the frame to the first integral extension and a second subset of the plurality of fibers to extend form within the frame to the second integral extension; and
removing the insulator body from the mold.

* * * * *